United States Patent
Aktas et al.

(10) Patent No.: US 7,200,556 B2
(45) Date of Patent: Apr. 3, 2007

(54) METHODS AND APPARATUS FOR ACCESSING AND PROCESSING MULTIMEDIA MESSAGES STORED IN A UNIFIED MULTIMEDIA MAILBOX

(75) Inventors: Christoph A. Aktas, Sunnyvale, CA (US); John W. Yates, Mountain View, CA (US); Phillip C. Meredith, Palo Alto, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 580 days.

(21) Appl. No.: 09/863,935

(22) Filed: May 22, 2001

(65) Prior Publication Data

US 2002/0178000 A1    Nov. 28, 2002

(51) Int. Cl.
G10L 15/26 (2006.01)
G10L 13/00 (2006.01)
H04M 1/64 (2006.01)

(52) U.S. Cl. ............... 704/235; 704/260; 379/88.01

(58) Field of Classification Search ........... 704/7, 704/235, 258, 260, 231; 707/3; 379/88.01, 379/88.22
See application file for complete search history.

(56) References Cited

U.S. PATENT DOCUMENTS

| | | | |
|---|---|---|---|
| 4,837,798 A | | 6/1989 | Cohen et al. |
| 5,524,137 A | * | 6/1996 | Rhee .............................. 704/8 |
| 5,608,786 A | | 3/1997 | Gordon |
| 5,696,964 A | * | 12/1997 | Cox et al. ....................... 707/5 |
| 5,724,410 A | * | 3/1998 | Parvulescu et al. ...... 379/88.18 |
| 5,742,763 A | * | 4/1998 | Jones .......................... 719/317 |
| 5,794,039 A | * | 8/1998 | Guck .......................... 707/10 |
| 5,802,314 A | * | 9/1998 | Tullis et al. ................ 709/246 |
| 5,931,907 A | * | 8/1999 | Davies et al. ............... 709/218 |
| 6,003,070 A | * | 12/1999 | Frantz ......................... 709/206 |
| 6,061,718 A | | 5/2000 | Nelson et al. |
| 6,101,320 A | * | 8/2000 | Schuetze et al. ............ 709/206 |

(Continued)

FOREIGN PATENT DOCUMENTS

EP          0 951 165 A2       10/1999

(Continued)

OTHER PUBLICATIONS

Tascini et al; "Video Description by Automatic Content Extraction;" Visual Languages, 2000. Proceedings. 2000 IEEE International Symposium on , Sep. 10-13, 2000, pp. 89-90.*

(Continued)

*Primary Examiner*—David Hudspeth
*Assistant Examiner*—James S. Wozniak

(57) ABSTRACT

The invention provides the user of a unified messaging mailbox with efficient, intelligent, media and device sensitive methods and apparatus to access and process (e.g., read, listen, forward, and search) messages. The invention introduces media conversion capabilities to selectively treat multimedia messages and message attachments so that they can be efficiently handled by mobile devices like PDAs (Personal Digital Assistants), pagers, or phone devices (with or without a text display feature). Furthermore, the invention introduces message content analysis capabilities that will recognize linguistic relationships between messages regardless of the media type. The invention also describes the ability to present these linguistic relationships along with the standard messaging relationships (Message arrival time, subject, sender, etc.). Still further, the invention introduces a message referencing option that allows simpler message selection from certain devices.

10 Claims, 1 Drawing Sheet

U.S. PATENT DOCUMENTS

| | | |
|---|---|---|
| 6,236,987 B1 * | 5/2001 | Horowitz et al. ............... 707/3 |
| 6,289,304 B1 * | 9/2001 | Grefenstette .................... 704/9 |
| 6,289,337 B1 | 9/2001 | Davies et al. |
| 6,366,651 B1 | 4/2002 | Griffith et al. |
| 6,442,589 B1 * | 8/2002 | Takahashi et al. ........... 709/203 |
| 6,499,021 B1 * | 12/2002 | Abu-Hakima ................ 706/10 |
| 6,523,040 B1 | 2/2003 | Lo et al. |
| 6,578,025 B1 | 6/2003 | Pollack et al. |
| 6,601,093 B1 * | 7/2003 | Peters ........................ 709/220 |
| 6,606,373 B1 | 8/2003 | Martin |
| 6,633,630 B1 | 10/2003 | Owens et al. |
| 6,633,846 B1 * | 10/2003 | Bennett et al. ............. 704/257 |
| 6,718,368 B1 | 4/2004 | Ayyadurai |
| 6,745,368 B1 * | 6/2004 | Boucher et al. ......... 715/500.1 |
| 2002/0013815 A1 | 1/2002 | Obradovich et al. |
| 2002/0104088 A1 | 8/2002 | McGee et al. |
| 2003/0046421 A1 * | 3/2003 | Horvitz et al. .............. 709/238 |
| 2004/0143636 A1 | 7/2004 | Horvitz et al. |

FOREIGN PATENT DOCUMENTS

| | | |
|---|---|---|
| WO | WO 99/65256 A2 | 12/1999 |

OTHER PUBLICATIONS

U.S. Appl. No. 09/922,061, filed Aug. 2, 2001, Aktas et al.
U.S. Appl. No. 09/922,062, filed Aug. 2, 2001, Aktas et al.
Patel A et al: "A technique for multi-network access to multimedia message"; Computer Communications, Elsevier Science Publishers BV, Amsterdam, NL, vol. 20, No. 5, Jul. 1, 1997 pp. 324-337.
U.S. Appl. No. 60/255,016; filed Dec. 12, 2000; "Priorities generation and management".
Buyukkokten, O et al; "Power Browser: Efficient Web Browsing for PDAs;" Apr. 2000; ACM Proceedings of CHI 2000; pp. 430-437.
Chin-Yew Lin, "Training a Selection Function for Extraction," Nov. 1999, ACM Conference on Information and Knowledge Management, pp. 55-62.

* cited by examiner

METHODS AND APPARATUS FOR ACCESSING AND PROCESSING MULTIMEDIA MESSAGES STORED IN A UNIFIED MULTIMEDIA MAILBOX

BACKGROUND OF THE INVENTION

1. Field of the Invention

The invention relates to methods and apparatus for processing multimedia messages. More particularly, the invention relates to methods and apparatus for (1) converting messages from one medium to another; (2) performing message content analysis; (3) utlizizing linguistically based analysis tools to identify message relationships regardless of media type; (4) interrelating messages according to content; and (5) providing a simple message reference capability to simplify message access.

2. Brief Description of the Prior Art

Business people receive many different kinds of messages, e.g. electronic mail, voice mail, fax, video messages, attachments to electronic mail. It is possible and desirable to have all messages sent to a single mail box from which they may all be retrieved regardless of the message type. However, the only retrieval device which is capable of reading all of these different types of messages is a personal computer having a graphical display and audio video capability. Unfortunately, it is not always possible or convenient to retrieve messages with a personal computer.

A unified mailbox where all kinds of media (voice, fax, e-mail, and video) are made accessible and/or visible from virtually anywhere to a subscriber or user in one basket is a convenient means of communication when compared to handling multiple mailboxes with distinct media. Current solutions for a unified mailbox are inefficient, however, for someone with an intense communication style and a frequent need to handle his/her messages remotely. The mismatch of media type of the information and the capabilities of the various (often limited) devices used for remote access places a heavy burden on the user and the interface of the system. This is especially true for the interfaces utilizing a telephone with no display, or handheld devices with limited display capabilities.

Some of the problems arise in the context of compound and/or lengthy messages in connection with one or the other access means. For example, it is not possible to deliver voice and fax messages to a text-only e-mail capable device. It is also difficult to deal with lengthy e-mails delivered to a voice-only interface or to a text-interface with limited capabilities. Even when the device has a fully functional GUI interface, there is room for increased efficiency with large amounts of data. It is a challenge to efficiently present the information in various office document formats (e.g., Word Processor, Spreadsheet, and Presentations) associated with a message. It is often difficult to locate and visually present related messages and attachments. When the mailbox has many messages in it, it is difficult to reference the messages.

Other problems arise due to the increased amount of information the unified mailbox can provide. Current mechanisms for organizing and presenting relationships among messages (listing by arrival time, subject, sender, etc.) are insufficient for a large number of messages of varying media and, especially, mixed media within a given message.

It would be desirable to provide a flexible, media independent way of finding and navigating related messages. With current systems, for example, the user is unable to recognize that there is a relationship between a voice message and a fax without listening to the voice message and displaying/printing the fax.

Because the presentation of unified mailbox information is more complex, especially if relationships as described hereinabove are incorporated into the presentation, identifying an individual item (message or message attachment) for further action can become problematic. How does the client/user identify to the server which message is to be acted upon? Are the entire message and its attachments to be involved? Is it a single attachment or only the original message body? And if the messages are presented in a "graph" format, how does the user select an individual item?

Current unified mailbox systems offer media sensitivity for message retrieval only when accessed with a graphical user interface (GUI) from a PC client. If a particular media or office document is attached to an e-mail, the user needs to click-on it in order to launch a specific application, for example, an audio player for voice, tiff-viewer for fax, video player to view a video message, etc.

For users with intense communication requirements (e.g. executives or customer service agents who receive hundreds of compound messages daily) there are no means to quickly process inbox messages except by the sender information, the subject line, and maybe few lines of the message body. In order to read messages, the user has to click on or mark a certain item in a graphical interface in order to get to the message body.

No content summarization of lengthy text messages or respective attachments is available yet that would remarkably improve the efficiency of handling the daily information avalanche in the office.

Current mailbox searching does not provide visual display of content and temporal relationships. No search capability exists yet for non-text messages.

If a unified mailbox is accessed from a telephone interface, voice and e-mail messages are retrievable and the user can listen to both. Existing text-to-speech technology provides a means to convert the e-mail to voice. A fax message can be forwarded to a fax machine or printer.

However, if an e-mail contains an attachment, the systems are able to indicate that, but are unable to access its content. Similarly, the contents of a fax or other documents attached to an e-mail are indicated but not accessible to the user accessing the mailbox with a telephone interface.

If an e-mail is lengthy, the user may be able to navigate through it by accelerating the text-to-speech reading speed. However, there is no means of text content summarization applied to shorten the process without eventually losing/skipping critical content.

If messages are forwarded to a handheld device via a wireless service but the device has limited text-display capabilities only certain parts of the email (From, Subject and a limited number of characters of the message body) can be displayed. If the critical information in the message is not in the beginning of the message body that is displayed, it is "lost" to the recipient. He/she has to use other access methods or make a call into the messaging system/server to retrieve the full text message (by listening to it or by initiating a printing to a device nearby).

As mentioned above, voice and other media attachments are indicated but not transmitted and/or displayed on a text-only display. The user needs to use other access methods to retrieve the messages. Additionally, no text content summarization methods are utilized to deal with access device technology limitations.

Full message sensitivity is only provided when accessing a mailbox with a multimedia PC. However even multimedia PCs lack any means to summarize message content in order to make it more efficient for the recipient to read his/her lengthy messages. Also, there are yet no means to summarize content of attached documents.

When accessing a mailbox with a telephone, the media and device sensitivity is limited to voice and e-mail. Again, no techniques of text content summarization are applied yet in order to make the retrieval of the message information over the phone more convenient.

In the case of handheld or mobile devices with limited text-display capabilities, the problem is that lengthy messages are usually not transmitted in their entirety by the wireless/paging service providers. Additionally, any other media attachments are "lost". No content summarization of lengthy text messages or respective attachments is available yet that would remarkably improve the efficiency of handling the daily information avalanche in the office.

SUMMARY OF THE INVENTION

It is therefore an object of the invention to provide methods and apparatus for accessing multimedia messages from a unified mailbox.

It is also an object of the invention to provide methods and apparatus for converting media types in a unified multimedia mailbox.

It is another object of the invention to provide methods and apparatus for summarizing the content of messages in a unified multimedia mailbox.

It is yet another object of the invention to provide methods and apparatus for cross referencing related messages based on content.

It is another object of the invention to provide methods and apparatus for improved handling of email attachments.

It is still another object of the invention to provide methods and apparatus for customizing mail handling based on a system profile adapted to the device used to access the mailbox.

In accord with these objects which will be discussed in detail below the apparatus and associated methods of the invention include a mail server that provides multimedia message inbox for one or several users on a network; a subsystem that detects media attachments to messages in a mailbox; a subsystem that converts media attachments into another media type using text-to-speech, fax-to-text, video voice track into text and speech-to-text; a subsystem that analyzes and summarizes the text content of original or converted media in respect of the linguistic meaning; a subsystem that delivers appropriate media according to an access device and message purpose, as defined in a profile; a subsystem that identifies cross-media interrelationships between messages and controls the media conversions necessary for this analysis; and a subsystem that controls a reference number scheme.

The methods and apparatus of the invention solve the problems discussed above by utilizing advanced media conversion methods, analysis and summarization of message content, and intelligent forwarding concepts. It provides access device and media sensitive intelligence for a mailbox when retrieving or forwarding a particular message.

The concept of media conversion is extended beyond text-to-speech to other attachments; a speaker-independent, large vocabulary, telephony-quality speech recognition engine is utilized to convert a voice message to text or to convert the voice track of a video attachment into readable text. Similarly, fax information is converted into text.

According to the invention, the content of messages is automatically summarized. The summarization of a message content is an improvement toward efficiency, particularly in the case of a forwarded lengthy message to a handheld device with limited display capabilities. The same is true for reading a lengthy message over the phone. Summarization is also applied to attached media (e.g. fax, Word document) extends even the media content accessible.

Both, the media conversion and the content summarization applied together provide compatibility with the access device. Depending on the user, the types of potential access devices are usually predefined; therefore messages along with their attachments that form the message content can be tailored to those devices while accessed or forwarded according to a profile. This ensures the availability of more information to the recipient at the device of choice and that is probably most convenient. Still, if the user requires more information, he/she can utilize another access method.

The invention also provides cross-media searching and visual displaying. Often messages related to a specific topic of interest to the user are in different media and spread throughout the message store (e.g. in different folders). The cross-media search finds these messages and presents them to the user in a way that makes the content and time relationships clear allowing efficient use of the otherwise overwhelming amount of information. The search engine utilizes sophisticated linguistically based analysis tools to discover the message relationships.

Additionally, a reference number scheme for all messages is provided. All messages in a particular group reference number to be used in further actions. Thus a PDA user can, for example, get a summary of messages with reference numbers and an indication of the message type. This reference number may then be used to access that message, and through it, a particular attachment to that message for further. Voice commands may be used to invoke actions on items more efficiently using the reference numbers of messages.

DETAILED DESCRIPTION

Figure 1:
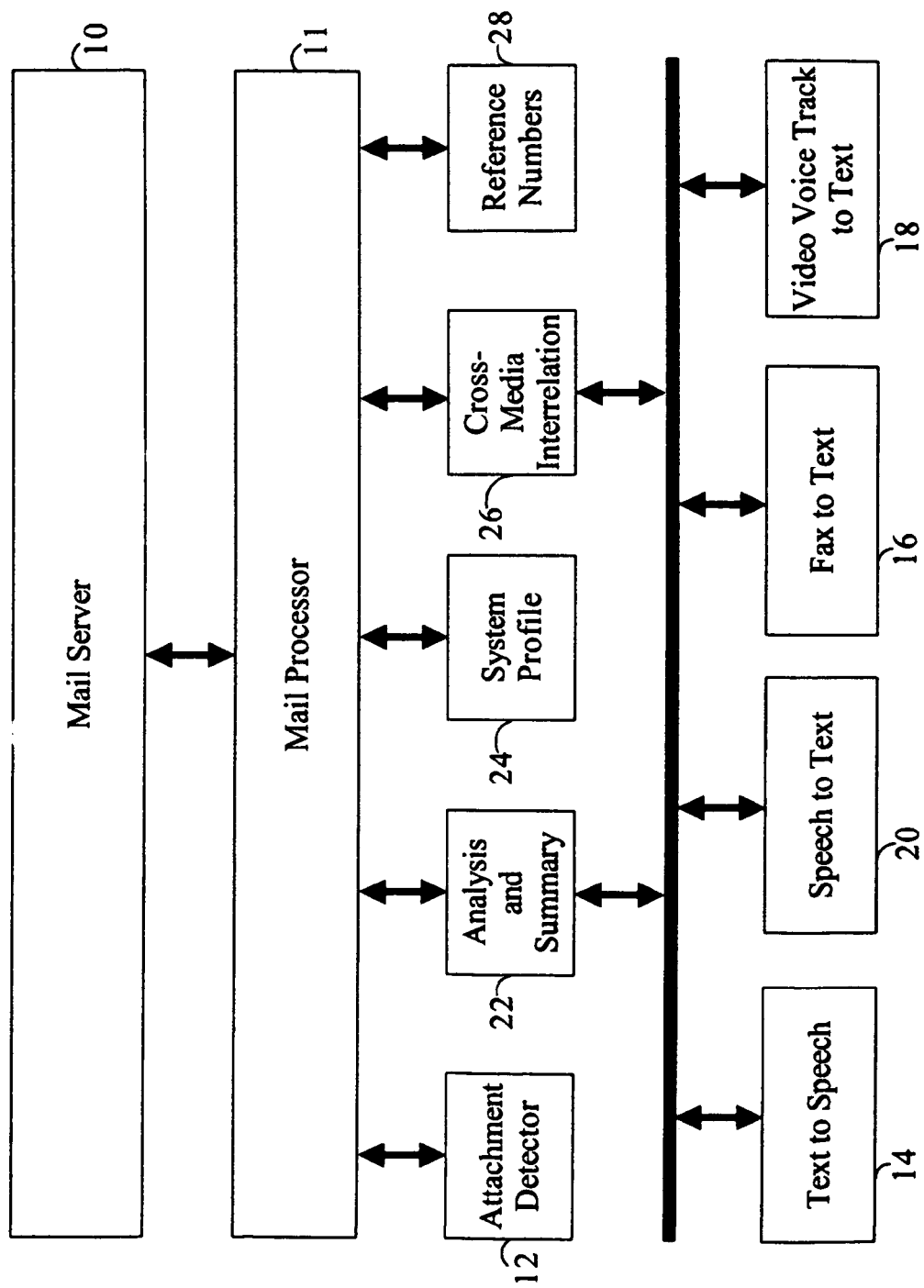
FIG. 1 is a high level block diagram of a multimedia mail system according to the invention.

Turning now to FIG. 1, an integrated multimedia messaging system according to the invention includes a mail server 10 that provides multimedia message inbox for one or several users on a network; a mail processor 11; a subsystem 12 that detects media attachments to messages in a mailbox; one or more subsystems that converts media attachments into another media type using text-to-speech 14, fax-to-text 16, video voice track into text 18 and speech-to-text 20 a subsystem 22 that analyzes and summarizes the text content of original or converted media in respect of the linguistic meaning; a subsystem 24 that delivers appropriate media according to an access device and message purpose, as defined in a profile; a subsystem 26 that identifies cross-media interrelationships between messages and controls the media conversions necessary for this analysis; and a subsystem 28 that controls a reference number scheme.

The invention can better be understood through an illustrative example such as the notification of a single-media voice message to a data pager. The following describes an example of this process involving a user that has a multimedia mailbox and a data pager who receives a voice message.

The problem is to provide the "best" information to the pager so the user can proceed most efficiently. What is the "best" information will vary according to the user's actual preferences, but will most likely include sender identification and meaningful portions of the message itself. In addition, there are probably messages the user would prefer to delay any handling of until an appropriate device is available. Thus the steps for sending voice messages to a pager would include: a) filtering messages to be processed, b) speech-to-text conversion, c) summarization and post filtering, and d) selection and delivery of text information to the device.

Since the resources involved in processing a message may be large, messages are pre-filtered. Speech-to-Text is "expensive" in its use of resources. Interrupting the user with any but the most important messages can be an unnecessary expense of the user's time and attention as well as a waste of system resources. Thus a mechanism to prevent the presentation of a message to a given device is important. This filtering is based on a variety of data including sender, message priority, etc. and the criteria for filtering is stored in the system profile for the user.

Voice messages which pass through the pre-filter are converted to text. This is most efficiently accomplished on the server side, perhaps with a dedicated "helper" server explicitly for the server so as not to disturb other processing on the server. The resulting text message is then be associated with the original message (as the text message body or as a separate attachment).

Before sending the text message to the pager, it is subjected to post-conversion filtering and summarization. Post-conversion filtering is optional, preventing processing of messages that appear not to be on a topic deemed important to the user. If it does not appear important, it would then remain in the mailbox to be processed. If the message survives the post-conversion filtering step, the text is then summarized.

Most simply, summarization includes reduction to a list of keywords and phrases found within the text. The summarization is created by removing from the message words/phrases not found within the user-defined list of keywords/phrases. More complex summarization includes allowing the user to specify the keyword/phrase list based on the sender of the message.

Since the message is a speech-to-text conversion, the keywords and their homonyms should be checked. An option on the summarization, for example a check box that says "allow homonyms", could be utilized to enable this feature.

Even more complex summarization methods contemplated by the invention involve performing sophisticated grammatical parsing and analysis.

Data is transmitted to the pager based on a user defined data selection criteria which is stored as a template in the system profile for the user. The data available for selection includes sender same, time, summary, message priority, un-summarized text, and other fields as available.

The user describes a template that indicates the information desired and the number of characters of each field desired. For example:

"From %SENDER% at %TIME%: %100SUMMARY%"

indicates that the user wants a string that includes the entire sender name, the received time and the first 100 characters of the summary to appear on his pager.

When the user receives the page, the summary information gives him/her enough information to determine how critical the message is. If it appears critical, he/she may choose to access the entire message using a different device, e.g. a telephone.

Another example is the retrieval of text messages (such as email) via a telephone. Text messages are pre-filtered as described above. The text is then summarized. The summary is then converted to speech which is played on the telephone to the user calling in for messages.

Still another example is sending a fax message to a PDA. Fax messages are pre-filtered based on sender and priority. The fax messages which pass through the filter are converted to text with OCR (optical character recognition) software. The text is summarized. Data is selected using a user defined template. The text message is sent tot he PDA and the user is "notified".

In general, a user can define a "morphing process" for messages in the context of any particular target device such as a pager or a cell phone with a limited display.

The morphing process is a combination of message filtering, message restructuring, data conversion, data summarization, data selection and notification steps that are configured to handle particular media types for particular target devices. Each user may define a set of rules and parameters for each device type defining how messages are morphed.

For example, a user may have a Voice Message-to-Pager morph definition that would do the following:
  (a) filter messages based on sender and priority, removing from further processing (i.e. leaving on the server) messages that are not deemed urgent enough to disturb the user while out of the office;
  (b) perform speech-to-text conversion;
  (c) summarize the text based on criteria defined by the user;
  (d) perform further filtering based on the summarized/converted text;
  (e) organize the text in a template; and
  (f) send the message to the pager.

In general, a morphing process will include these steps in some order determined by the user. In addition, message restructuring steps allow the user to handle multiple attachments of varying media attached to the message. For example, the user may select that a summary of the attachments be created (attachment name and media type) or may request that the attachments be expanded, converted and summarized as described above for the single media message.

There have been described and illustrated herein methods and apparatus for processing multimedia messages. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:
1. A multimedia mailbox system, comprising:
  a) a message store for storing multimedia messages; and
  b) a plurality of data converters for converting messages in one medium to messages in another medium, wherein the conversion of messages is based upon a set of user-definable parameters, said set of user-definable parameters including sender information, message priority and summarization rules and wherein messages are only converted when determined urgent based upon sender information and message priority, the summarization rules reducing messages to a list of keywords from a plurality of lists of keywords, each keyword of each list being selectable by a user, said list of keywords applied to the messages being based upon the sender information.

2. A system according to claim 1 wherein said plurality of data converters includes at least two selected from the group consisting of a text to speech converter, a speech to text converter, and a fax to text converter.

3. A system according to claim 1 further comprising means for linguistically based searching of multiple message types and for linguistically relating multiple messages of different type.

4. A multimedia mailbox system, comprising:
   a) a message store for storing multimedia messages;
   b) a plurality of data converters for converting messages in one medium to messages in another medium; and
   c) means for linguistically based searching of multiple message types and for linguistically relating multiple messages of different type, wherein the conversion of messages is based upon a set of user-definable parameters, said set of user-definable parameters including sender information, message priority and summarization rules and wherein messages are only converted when determined urgent based upon sender information and message priority, the summarization rules reducing messages to a list of keywords from a plurality of lists of keywords, each keyword of each list being selectable by a user, said list of keywords applied to the messages being based upon the sender information.

5. A system according to claim 4 wherein said plurality of data converters includes at least two selected from the group consisting of a text to speech converter, a speech to text converter, and a fax to text converter.

6. A method for managing a multimedia mailbox, comprising the steps of:
   a) storing messages of different types in a single mailbox; and
   b) automatically converting messages from one medium to another, wherein the conversion of messages is based upon a set of user-definable parameters, said set of user-definable parameters including sender information, message priority and summarization rules and wherein messages are only converted when determined urgent based upon sender information and message priority, the summarization rules reducing messages to a list of keywords from a plurality of lists of keywords, each keyword of each list being selectable by a user, said list of keywords applied to the messages being based upon the sender information.

7. A method according to claim 6 wherein said step of converting includes at least-two selected from the group consisting of converting text to speech, converting speech to text, and converting fax to text.

8. A method according to claim 6 further comprising the step of linguistically searching multiple message types and linguistically relating multiple messages of different type.

9. A method for managing a multimedia mailbox, comprising the steps of:
   a) storing messages of different types in a single mailbox;
   b) automatically converting messages from one medium to another;
   c) linguistically searching multiple message types and linguistically relating multiple messages of different type, wherein the conversion of messages is based upon a set of user-definable parameters, said set of user-definable parameters including sender information, message priority and summarization rules and wherein messages are only converted when determined urgent based upon sender information and message priority, the summarization rules reducing messages to a list of keywords from a plurality of lists of keywords, each keyword of each list being selectable by a user, said list of keywords applied to the messages being based upon the sender information.

10. A method according to claim 9 wherein said step of converting includes at least two selected from the group consisting of converting text to speech, converting speech to text, and converting fax to text.

* * * * *